United States Patent [19]

Herz

[11] Patent Number: 5,291,609
[45] Date of Patent: Mar. 1, 1994

[54] COMPUTER INTERFACE CIRCUIT

[75] Inventor: William S. Herz, Newark, Calif.

[73] Assignee: Sony Electronics Inc., Park Ridge, N.J.

[21] Appl. No.: 996,836

[22] Filed: Dec. 23, 1992

Related U.S. Application Data

[63] Continuation of Ser. No. 714,650, Jun. 13, 1991.

[51] Int. Cl.$^5$ .............................................. G06F 13/14
[52] U.S. Cl. .................................... 395/725; 395/325; 364/238.3; 364/238.5; 364/241.2; 364/241.3; 364/244; 364/244.3; 364/DIG. 1
[58] Field of Search ............... 395/575, 200, 325, 500, 395/575, 725

[56] References Cited

U.S. PATENT DOCUMENTS

| | | | |
|---|---|---|---|
| 4,231,087 | 10/1980 | Hunsberger et al. | 395/575 |
| 4,371,950 | 2/1983 | Chadra | 364/900 |
| 4,435,763 | 3/1984 | Bailey et al. | 364/200 |
| 4,569,062 | 2/1986 | Dellande et al. | 375/117 |
| 4,630,041 | 12/1986 | Casamatta et al. | 364/200 |
| 4,680,732 | 7/1987 | DiCenzo | 364/900 |
| 4,683,550 | 7/1987 | Jindrick et al. | 364/900 |
| 4,685,124 | 8/1987 | Smitt et al. | 364/200 |
| 4,695,952 | 9/1987 | Howland | 395/325 |
| 4,736,394 | 4/1988 | Giovannelli et al. | 375/121 |
| 4,751,634 | 6/1988 | Burrus, Jr. et al. | 364/200 |
| 4,831,520 | 5/1989 | Rubinfeld et al. | 395/325 |
| 4,852,045 | 7/1989 | Kraul et al. | 395/325 |
| 4,868,784 | 9/1989 | Marshall et al. | 364/900 |
| 4,897,842 | 1/1990 | Herz et al. | 371/22.4 |
| 4,899,306 | 2/1990 | Greer | 395/500 |
| 4,901,218 | 2/1990 | Cornwell | 364/131 |
| 4,933,846 | 6/1990 | Humphrey et al. | 395/325 |
| 4,980,820 | 12/1990 | Youngblood | 364/200 |
| 5,016,162 | 5/1991 | Epstein et al. | 364/200 |

Primary Examiner—Michael R. Fleming
Assistant Examiner—Tariq R. Hafiz
Attorney, Agent, or Firm—Limbach & Limbach

[57] ABSTRACT

An interface circuit for providing asynchronous interrupt service for multiple peripheral devices in accordance with instructions from a host computer includes two dual universal asynchronous receivers-transmitters ("UARTs"), a dual port random-access memory ("RAM") and a microprocessor ("μP"). The dual UARTs selectively read data separately from selected peripheral devices and selectively write that data to the dual port RAM for access by the host computer, and read data from the dual port RAM as stored therein by the host computer and write that data to a selected peripheral device, in accordance with addresses from the μP. Following initiation of an interrupt sequence, the dual port RAM allows the host computer to selectively and asynchronously read data (e.g. from a peripheral device via a dual UART) therefrom and write necessary data or instructions (e.g. for the μP or a peripheral device via a dual UART) thereto for the μP to asynchronously provide interrupt service to the peripheral devices. This interface circuit configuration minimizes idle time for the host computer during interrupt servicing by the μP.

12 Claims, 3 Drawing Sheets

COMPUTER INTERFACE CIRCUIT

This is a continuation of co-pending application Ser. No. 07/714,650 filed on Jun. 13, 1991.

BACKGROUND OF THE INVENTION

1. Field of the Invention

The present invention relates to computer interface circuits, and in particular, to computer interface circuits operating in a control environment and providing asynchronous interrupt service to multiple peripheral devices.

2. Description of the Related Art

The types of computer interface circuit designs available, as well as their applications, are virtually unlimited in number. As computers have become more prevalent and their applications more varied, more interface circuit designs have become necessary for providing the appropriate interface between the computers and their operating environments.

A common type of computer interface circuit is designed for operating in a control environment in which interrupt service must be provided for multiple peripheral devices. For example, referring to FIG. 1, a typical design for such an interface circuit 10 includes: read 12 and write 14 buffers; a decoder 16; a parallel input-output controller ("PIO") 18; a dual universal asynchronous receiver-transmitter ("UART") 20; a microprocessor ("µP") 22; a read-only memory ("ROM") 24; and a random-access memory ("RAM") 26, substantially as shown.

Incoming data from the data bus of a host computer (not shown) is captured and held by the write buffer 14. This data is then transferred via the PIO 18, under control of the µP 22, to the RAM 26 for temporary storage before subsequently being transferred to a peripheral device (not shown) via the dual UART 20. Data coming from a peripheral device via the dual UART 20 is stored in the RAM 26, and then, under control of the µP 22, is transferred to the data bus of the host computer via the PIO 18 and read buffer 12. The read 12 and write 14 buffers are appropriately enabled or disabled by the decoder 16, which is controlled by the host computer via its address bus.

A problem with this conventional interface circuit design involves the need for and use of the read 12 and write 14 buffers, the PIO 18 and RAM 26. This configuration produces a data bottleneck which excessively "loads down" the host computer, i.e. with respect to the host computer's involvement time with the operation of the interface circuit 10. Particularly where the interface circuit 10 is used for servicing interrupts for the peripheral devices, this configuration results in the host computer standing by in a wait, or idle, mode while the µP 22 transfers data for servicing the interrupt. Virtually all data communication between the host computer and the interface circuit 10 (e.g. the µP 22) uses the PIO 18. Thus, while the µP 22 is retrieving data from the write buffer 14 via the PIO 18 and storing it in the RAM 26, or retrieving data from the RAM 26 for transfer to the read buffer 12 via the PIO 18, the host computer must wait.

Therefore, it would be desirable to have a computer interface circuit for operating in a control environment for servicing interrupts for peripheral devices, wherein such interface functions can be performed asynchronously with respect to the operation of the host computer, and with minimal interaction time required on the part of the host computer.

SUMMARY OF THE INVENTION

A computer interface circuit in accordance with the present invention provides asynchronous communication and control between a host computer and a plurality of peripheral devices. The present invention includes a transceiver for selectively reading input data from and writing output data to at least one peripheral device. The present invention further includes a memory for selectively reading input data from and writing output data to a host computer, and for selectively reading the peripheral device input data from and writing the peripheral device output data to the transceiver in accordance with internal memory addresses. The present invention still further includes a computer for providing the internal memory addresses to control the selective reading of peripheral device input data from and writing of peripheral device output data to the transceiver by the memory. The computer further controls the selective reading of peripheral device input data and writing of peripheral device output data by the transceiver.

These and other features and advantages of the present invention will be understood upon consideration of the following detailed description of the invention and the accompanying drawings.

DETAILED DESCRIPTION OF THE INVENTION

Figure 1:
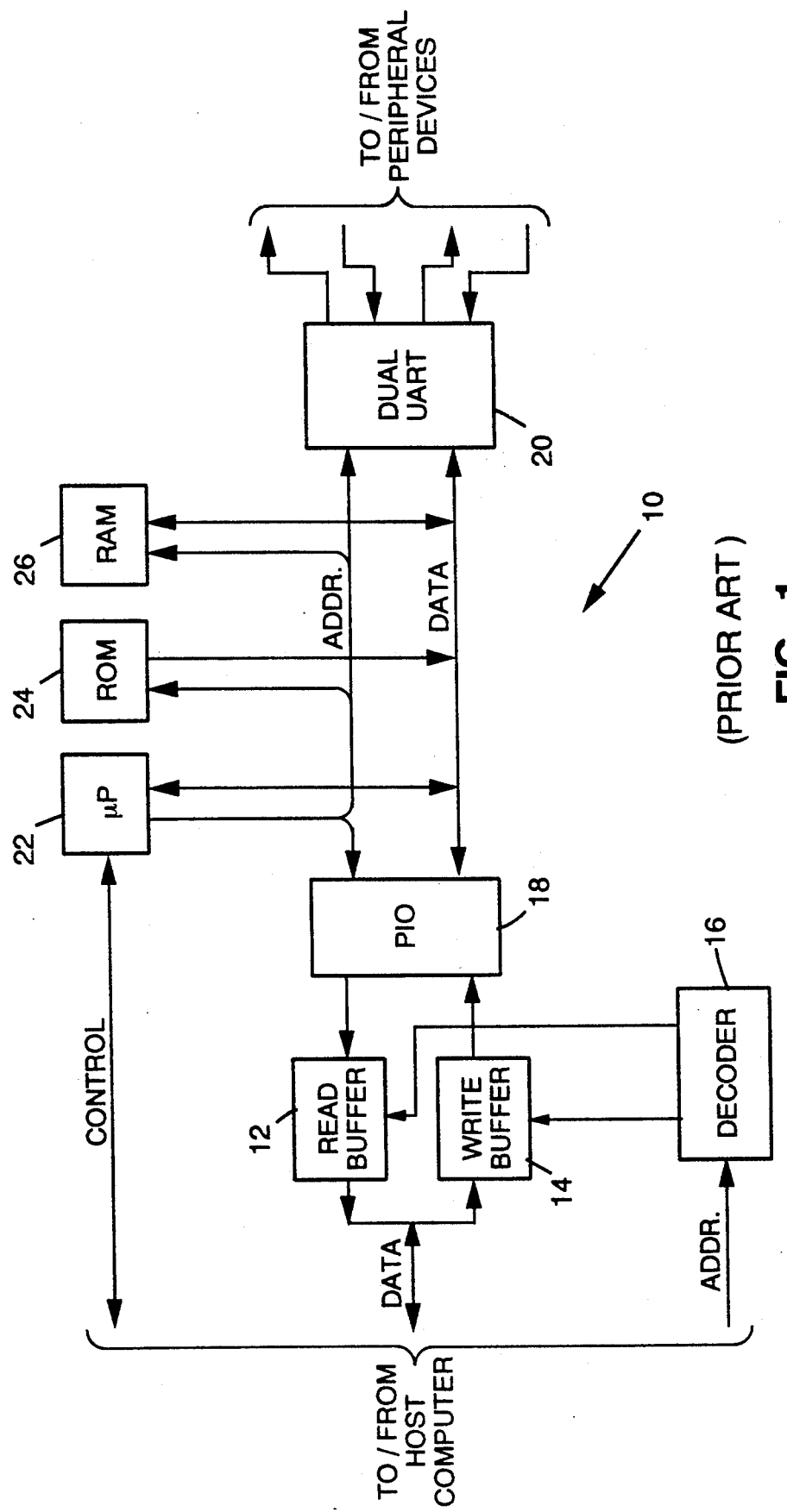
FIG. 1 is an exemplary functional block diagram of a conventional computer interface circuit.
Figure 2:
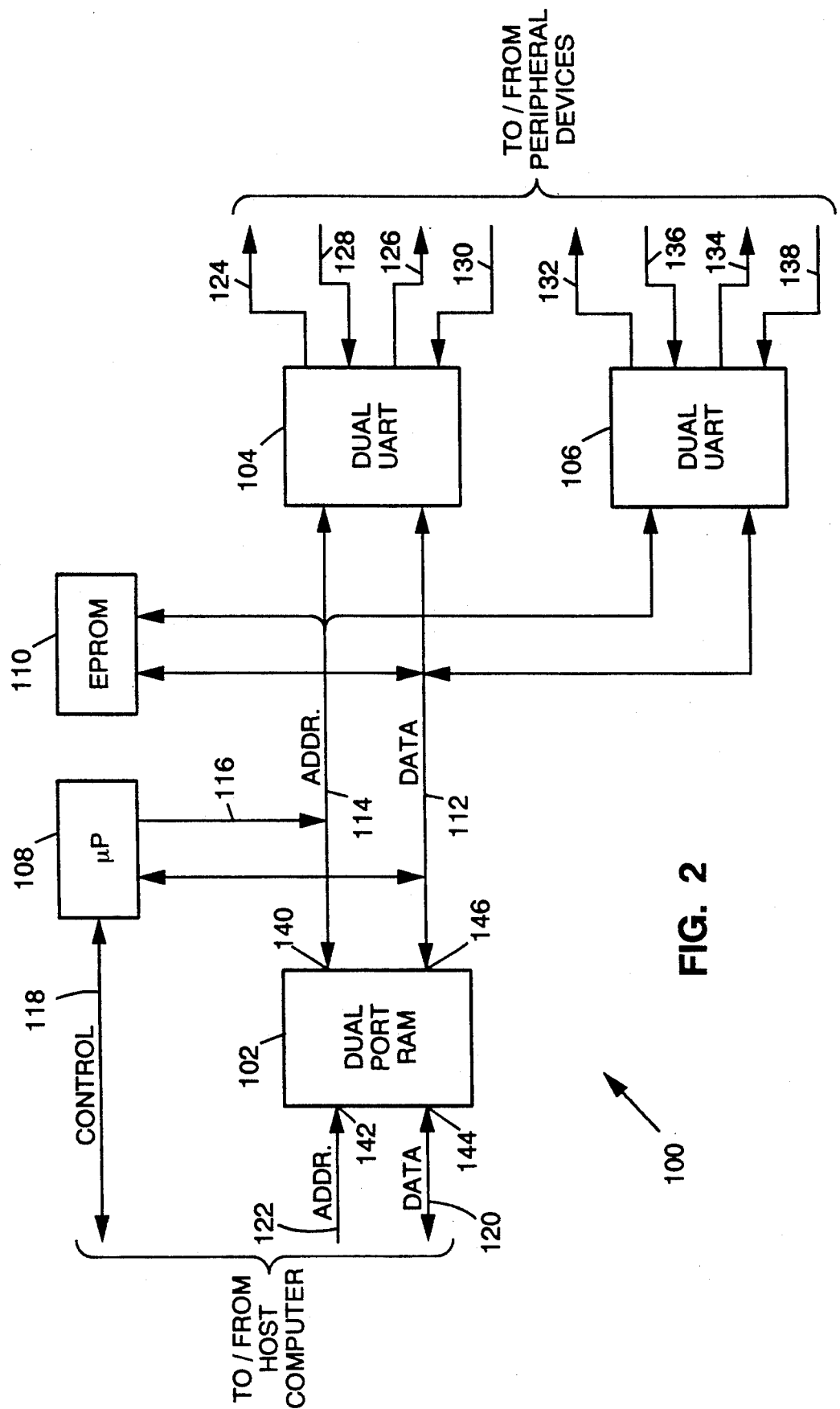
FIG. 2 is a functional block diagram of a computer interface circuit in accordance with the present invention.

Referring to FIG. 2, a computer interface circuit 100 in accordance with the present invention includes: a dual port RAM 102; two dual UARTs 104, 106; a µP 108; and an electrically programmable read-only memory ("EPROM") 110, substantially as shown. An internal data bus 112 couples the foregoing elements for transferring data internally within the interface circuit 100. An address bus 114 also couples the foregoing elements for transferring addresses 116 from the µP 108.

The µP 108 exchanges control data 118 with a host computer (not shown). The dual port RAM 102 exchanges data 120 with the host computer in accordance with addresses 122 received from the host computer. These data 120 and addresses 122 are exchanged or received via the data and address buses of the host computer (not shown).

The first dual UART 104 provides two output data signals 124, 126 to and receives two associated input data signals 128, 130, respectively, from two peripheral devices (not shown). Similarly, the second dual UART 106 provides two output data signals 132, 134 to and receives two associated input data signals 136, 138, respectively, from two more peripheral devices (not shown). The dual UARTs 104, 106 receive the data for their output signals 124, 126, 132, 134 from the internal data port 146 of the dual port RAM 102 via the internal data bus 112. Similarly, the dual UARTs 104, 106 transfer the data received via their input signals 128, 130, 136, 138 to the internal data port 146 of the dual port RAM 102 via the internal data bus 112. The µP 108 controls the outputting of data from the data bus 112 via the dual UARTs 104, 106 by providing appropriate addresses to the dual UARTs 104, 106 via the internal address bus 114. Similarly, the µP 108 controls the transfer of input data received by the dual UARTs 104, 106 onto the internal data bus 112 by providing appropriate addresses to each of the dual UARTs 104, 106 via the address bus 114.

The µP 108 also controls the reading of data from and writing of data to the internal data port 146 of the dual port RAM 102 via the internal data bus 112 by providing appropriate addresses to the internal address port 140 of the dual port RAM 102 via the internal address bus 114. The EPROM 110 selectively contains program data for the µP 108, which can be made available thereto when addressed by the µP 108 via the internal address bus 114.

The dual port RAM 102 reads data 120 from or writes data 120 to the data bus of the host computer (not shown) via its external data port 144 in accordance with addresses 122 received via the host computer address bus (not shown) at its external address port 142. As is known in the art, the dual port RAM 102 can read or write data at its external data port 144 in accordance with addresses received at its external address port 142 while asynchronously reading or writing data at its internal data port 146 in accordance with addresses received at its internal address port 140.

The computer interface circuit 100 of the present invention can provide interrupt service for multiple peripheral devices with minimal interaction time required on the part of its host computer. The necessary data (or instructions) 120 for servicing a peripheral device, or devices, can be inputted to the dual port RAM 102 via its external data port 144 in accordance with addresses 122 from the host computer (not shown). When finished inputting the data (or instructions), the host computer is free for other processing activity. Meanwhile, the µP 108 can asynchronously address the data (or instructions) within the dual port RAM 102 and transfer it via the internal data bus 112 to the appropriate dual UART 104, 106. Any instructions needed by the µP 108 and stored as part of the data within the dual port RAM 102 can be retrieved by the µP 108 via the internal data bus 112. The instructions or data needed for servicing the peripheral device, or devices, can then be outputted by the appropriate dual UART 104, 106 as one of its output signals 124, 126, 132, 134. As should be recognized from the foregoing discussion, the dual port RAM 102 eliminates a data bottleneck by allowing data to be selectively and asynchronously read or written at either or both of its data ports 144, 146.

Figure 3:
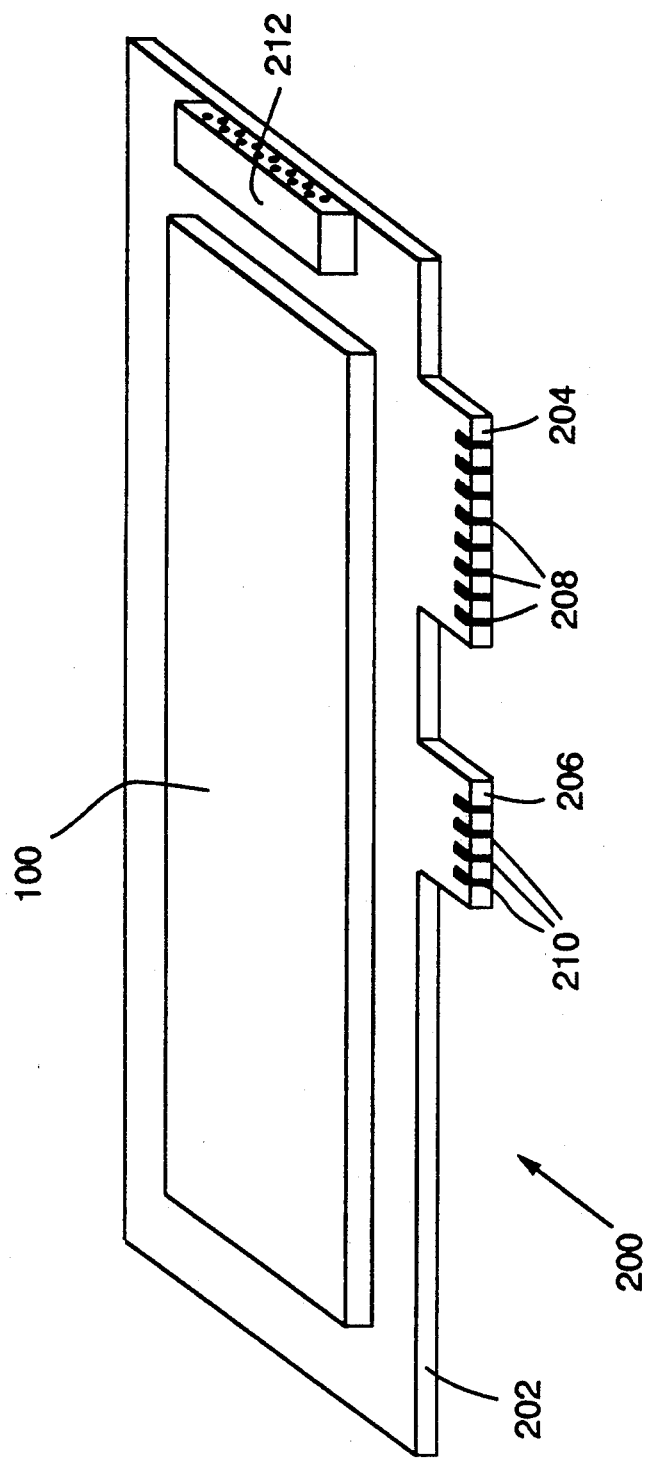
FIG. 3 illustrates an exemplary circuit card configuration for the interface circuit of FIG. 2.

Referring to FIG. 3, a preferred embodiment of a computer interface circuit assembly in accordance with the present invention includes a printed circuit board assembly 200 upon which the interface circuit 100 of FIG. 2 is mounted. This printed circuit board assembly 200 includes a printed circuit board 202 with two protruding flanges 204, 206 which serve as support members for printed edge connectors 208, 210. These flanges 204, 206 with their printed edge connectors 208, 210 are inserted into edge connector receptacles mounted on a main circuit board within the host computer (not shown). For example, in a preferred embodiment of the present invention, the printed circuit board assembly 200 and its flanges 204, 206 with printed edge connectors 208, 210 is fabricated for installation in an IBM ® AT personal computer. In this embodiment, a surface-mounted multi-contact connector 212 is included at one end of the printed circuit board assembly 200 for interfacing with external (e.g. peripheral) devices.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. An interface circuit for providing asynchronous communication and control between a host computer and at least one peripheral device, the interface circuit comprising:

transceiver means for receiving a first internal memory address and in accordance therewith receiving peripheral device input data from and transmitting peripheral device output data to at least one peripheral device;

memory means coupled to the transceiver means for receiving a second internal memory address and in accordance therewith reading the peripheral device input data from and writing the peripheral device output data to the transceiver means and further for receiving an external memory address via an external address port and in accordance therewith reading host computer input data from and writing host computer output data to a host computer; and computer means coupled to the transceiver means and the memory means for providing the first and second internal memory addresses thereto, respectively;

wherein the first internal memory address, the second internal memory address and the external memory address are each distinct from one another.

2. An interface circuit as recited in claim 1, further comprising a data bus coupling the transceiver means and the memory means.

3. An interface circuit as recited in claim 1, further comprising an address bus coupling the computer means, the transceiver means and the memory means.

4. An interface circuit as recited in claim 1, wherein the memory means selectively reads the host computer input data and writes the host computer output data asynchronously with respect to the reading of the received peripheral device input data and the writing of the peripheral device output data.

5. An interface circuit as recited in claim 1, wherein the transceiver means comprises a universal asynchronous receiver-transmitter.

6. An interface circuit as recited in claim 1, wherein the memory means comprises a dual port random access memory.

7. An interface circuit as recited in claim 1, wherein the computer means comprises a microprocessor.

8. An interface circuit for providing asynchronous interrupt service for a plurality of peripheral devices in accordance with control data from a host computer, the interface circuit comprising:

a data bus;
   an address bus;
   a data transceiver which includes a first address port coupled to the address bus for receiving a plurality of transceiver addresses therefrom, and which includes a plurality of external data ports for selectively receiving peripheral device input data from and providing peripheral device output data to a plurality of peripheral devices in accordance with the received plurality of transceiver addresses, and which further includes a first data port coupled to the data bus for providing the received peripheral device input data thereto and receiving the peripheral device output data therefrom in accordance with the received plurality of transceiver addresses;

a memory which includes a second address port coupled to the address bus for receiving a plurality of internal memory address therefrom, and which includes a third address port for receiving a plurality of external memory addresses, and which further includes a second data port for reading host computer input data from and writing host computer output data to a host computer in accordance with the received plurality of external memory addresses, and which still further includes a third data port coupled to the data bus for writing the host computer input data thereto and reading the host computer output data therefrom in accordance with the received plurality of internal memory addresses; and a computer which includes a fourth address port coupled to the address bus for selectively providing the pluralities of transceiver and internal memory addresses thereto, and which further includes a fourth data port coupled to the data bus for selectively receiving the received peripheral device input data and the written host computer input data therefrom;

wherein the plurality of transceiver addresses, the plurality of internal memory addresses and the plurality of external memory addresses are each distinct from one another.

9. An interface circuit as recited in claim 8, wherein the memory selectively reads the host computer input data and writes the host computer output data asynchronously with respect to the reading of the host computer output data and the writing of the host computer input data.

10. An interface circuit as recited in claim 8, wherein the data transceiver comprises a plurality of universal asynchronous receivers-transmitters.

11. An interface circuit as recited in claim 8, wherein the memory comprises a dual port random access memory.

12. An interface circuit as recited in claim 8, wherein the computer comprises a microprocessor.

* * * * *